(12) United States Patent
Freed

(10) Patent No.: US 11,483,270 B2
(45) Date of Patent: Oct. 25, 2022

(54) EMAIL FILTERING SYSTEM FOR EMAIL DELIVERY SYSTEMS

(71) Applicant: Oracle International Corporation, Redwood Shores, CA (US)

(72) Inventor: Edwin Earl Freed, Claremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/458,094

(22) Filed: Aug. 26, 2021

(65) Prior Publication Data
US 2022/0166736 A1     May 26, 2022

Related U.S. Application Data

(60) Provisional application No. 63/117,876, filed on Nov. 24, 2020.

(51) Int. Cl.
*H04L 51/212*     (2022.01)

(52) U.S. Cl.
CPC .................... *H04L 51/212* (2022.05)

(58) Field of Classification Search
CPC ..... G06F 15/16; H04L 51/12; H04L 63/1408; H04L 9/3243; H04L 63/1441; H04L 63/0428; H04L 51/212; H04L 51/21; H04L 43/00; H04L 43/022; H04L 43/024
See application file for complete search history.

(56) References Cited

U.S. PATENT DOCUMENTS

| | | | | |
|---|---|---|---|---|
| 7,089,241 | B1 * | 8/2006 | Alspector | H04L 51/212 |
| 7,580,982 | B2 * | 8/2009 | Owen | H04L 51/12 |
| | | | | 709/204 |
| 7,764,951 | B2 * | 7/2010 | Patel | H04M 3/487 |
| | | | | 455/414.1 |
| 8,024,803 | B1 * | 9/2011 | Cooley | H04L 51/212 |
| | | | | 726/22 |
| 8,028,031 | B2 * | 9/2011 | Colvin | G06Q 10/107 |
| | | | | 709/206 |

(Continued)

OTHER PUBLICATIONS

International Patent Application PCT/US2021/047895, International Search Report and Written Opinion dated Dec. 2, 2021, 12 pages.

*Primary Examiner* — Sargon N Nano
(74) *Attorney, Agent, or Firm* — Kilpatrick Townsend & Stockton LLP

(57) ABSTRACT

An email message delivery system is disclosed that enables the efficient processing and delivery of email messages by selectively sampling and scanning email messages prior to delivering the email messages to its intended recipients. The system selects an email message for processing and determines a group for the email message. The system determines a sampling probability for the group and based on the sampling probability determines whether the email message is selected for scanning. If the email message is selected for scanning, the system scans content of the email message and based on the scanning, determines whether the email message is to be filtered out. If the email message is not to be filtered out based on the scanning, the system relays the email message for delivery to the recipient.

20 Claims, 10 Drawing Sheets

(56) References Cited

U.S. PATENT DOCUMENTS

| | | | | |
|---|---|---|---|---|
| 8,606,867 | B2* | 12/2013 | Deshpande | G06Q 10/107 |
| | | | | 709/224 |
| 9,177,293 | B1* | 11/2015 | Gagnon | G06Q 10/107 |
| 9,501,746 | B2* | 11/2016 | Prakash | H04L 47/62 |
| 2005/0015626 | A1* | 1/2005 | Chasin | H04L 63/0245 |
| | | | | 726/4 |
| 2006/0129644 | A1* | 6/2006 | Owen | G06Q 10/107 |
| | | | | 709/206 |
| 2006/0149823 | A1* | 7/2006 | Owen | G06Q 10/107 |
| | | | | 709/206 |
| 2007/0038705 | A1* | 2/2007 | Chickering | H04L 51/212 |
| | | | | 709/206 |
| 2008/0172468 | A1* | 7/2008 | Almeida | G06Q 10/107 |
| | | | | 709/206 |
| 2008/0201433 | A1* | 8/2008 | McDonald | G06Q 10/107 |
| | | | | 709/206 |
| 2009/0285474 | A1* | 11/2009 | Berteau | H04L 51/212 |
| | | | | 382/159 |
| 2009/0327430 | A1* | 12/2009 | Colvin | G06Q 10/107 |
| | | | | 709/206 |
| 2010/0306856 | A1* | 12/2010 | Suciu | G06Q 10/107 |
| | | | | 709/206 |
| 2011/0045821 | A1* | 2/2011 | Tyce | H04W 24/10 |
| | | | | 455/424 |
| 2015/0312186 | A1* | 10/2015 | Giura | H04L 51/212 |
| | | | | 709/206 |
| 2016/0277336 | A1* | 9/2016 | Sachtjen | H04W 12/069 |
| 2018/0219820 | A1* | 8/2018 | Kramer | G06Q 30/0248 |

* cited by examiner

EMAIL FILTERING SYSTEM FOR EMAIL DELIVERY SYSTEMS

CROSS-REFERENCES TO RELATED APPLICATIONS

The present application is a non-provisional application of and claims the benefit and priority under 35 U.S.C. 119(e) of U.S. Provisional Application No. 63/117,876, filed Nov. 24, 2020 entitled "Sampling Approach for filtering email message streams," the entire contents of which are incorporated herein by reference for all purposes.

BACKGROUND

Several cloud service providers offer cloud-based email delivery services that provide a fast and reliable solution for customers of these services to send high volumes of emails to their intended recipients. These emails may include marketing emails, transactional emails, alert emails, verification emails, and other types of emails. An example of such an email delivery service is the Oracle Cloud Infrastructure (OCI) Email Delivery service provided by Oracle Corporation. The OCI Email Delivery service provides a platform that uses key deliverability metrics to ensure the best sending reputation possible for customer's emails.

Due to the increasing popularity of email delivery services, the volume of emails processed by these services continues to rise rapidly. In certain situations, the processing of large volumes of email messages may require the scanning of messages for their content prior to delivery to recipients. Content scanning can be an expensive, computationally intensive, and time consuming process. Existing architectures implementing these services need to be improved to make the services scalable, cost effective, and reliable.

BRIEF SUMMARY

The present disclosure relates generally to cloud-based email delivery services. More specifically, but not by way of limitation, this disclosure describes a cloud-based email message delivery system (EMDS) that provides improved capabilities for filtering email messages prior to delivery to their intended recipients based on selective sampling and content scanning of the email messages.

In certain embodiments, an email message delivery system (EMDS) providing an email message delivery service is disclosed. The EMDS selects an email message for processing from a message queue of the EMDS. The message queue comprises email messages received from multiple senders. The senders correspond to multiple subscribers of the email message delivery service. The EMDS determines a group for the email message and in order to avoid scanning every message, determines a sampling probability for the group. Based on the sampling probability determined for the group, the EMDS determines whether the email message is selected for scanning. Responsive to determining that the email message is selected for scanning, the EMDS scans the content of the email message and determines, based on the scanning, whether the email message is to be filtered out. Responsive to determining that the email message is not to be filtered out based on the scanning, the EMDS relays the email message for delivery to the recipient.

In certain examples, the EMDS determines that the email message is to be filtered out based on the scanning. Responsive to determining that the email message is to be filtered out, the EMDS drops the email message from the message queue. In certain examples, the EMDS determines that the email message is not selected for scanning based on the sampling probability. Responsive to the determining, the EMDS relays the email message for delivery to the recipient without scanning the email message.

In certain examples, the EMDS determines the group for the email message by identifying a set of one or more grouping rules for a sender associated with the message and identifying metadata associated with the email message. The EMDS then determines the group for the email message based on the set of one or more grouping rules and the metadata. In certain examples, the metadata comprises the sender associated with the email message or a size of the email message.

In certain examples, the EMDS determines the sampling probability for the group based on state information associated with the group, availability of a set of one or more scanning resources for scanning the content of the email message and a set of one or more sampling rules. In certain examples, the state information associated with the group comprises a reputation of a sender associated with the group, the number of emails that have previously been filtered out from the group, the number of emails that have previously been scanned for the group or compliance rules specific to a sender associated with the group.

In certain examples, the EMDS scans the content of the email message by identifying a scanning resource to be used for scanning the content of the email message. The EMDS then scans the content of the email message using the scanning resource.

In certain examples, the EMDS determines whether the email message is selected for scanning by obtaining a sampling history associated with the group of the email message. In certain examples, the sampling history identifies a previously received email message in a set of email messages of a group that was selected for scanning.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
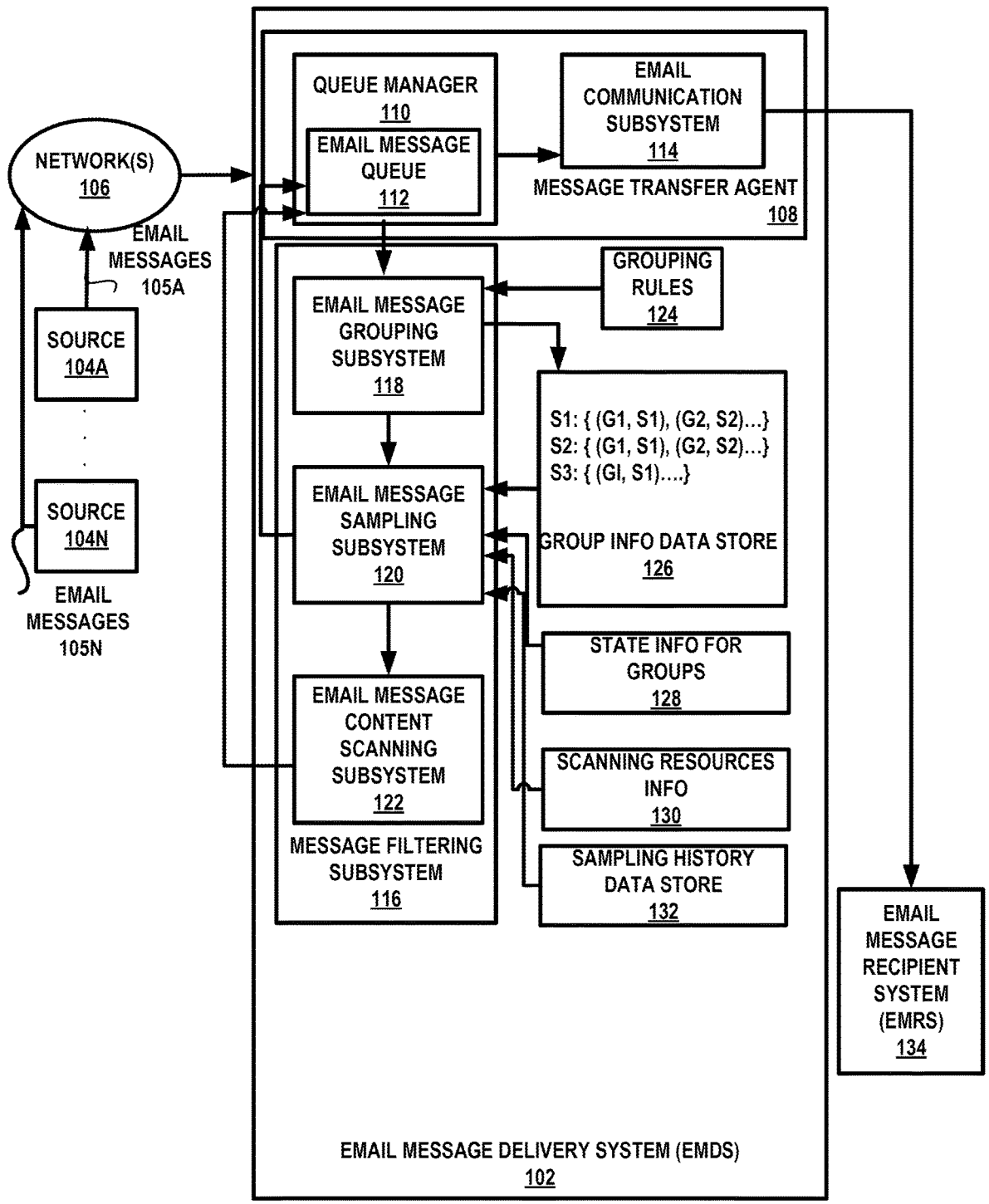
FIG. 1 depicts a computing environment that includes an email message delivery system (EMDS) that includes improved capabilities for filtering email messages prior to delivery to a set of recipients, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to cloud-based email delivery services. More specifically, but not by way of limitation, this disclosure describes a cloud-based email message delivery system (EMDS) that provides improved capabilities for filtering email messages prior to delivery to their intended recipients based on selective sampling and content scanning of the email messages.

Cloud-based email delivery services provide a fast and reliable managed solution for sending high-volume emails to be delivered to a set of intended recipients. A cloud-based email delivery service may be implemented using one or more cloud-based email delivery systems. A cloud-based email delivery system (EMDS) typically comprises one or more Message Transfer Agents (MTAs) that are configured to receive email messages from various tenants or customers of the email delivery service and deliver the email messages to their intended recipients. As described herein, a customer or a tenant of the EMDS may represent one or more "senders" of an email message. Various email message delivery protocols may be used for communicating the email messages to their intended recipients. In one embodiment, a Simple Message Transfer Protocol (e.g., SMTP) is used for communicating email messages to their intended recipients.

To efficiently process outbound email message flows, an EMDS may employ an email filtering technique to identify spam exiting their network and to ensure that email messages are reliably delivered to their intended recipients. Existing filtering techniques utilize various rules and metrics to perform message filtering. These techniques, for instance, may track the amount of spam coming from Internet Protocol (IP) addresses used to identify senders of messages, block IP addresses that send too much spam, or rate limit those IP addresses with questionable sending practices. The rules and metrics may include for instance, performing IP reputation checks to monitor the reputation of the IP addresses (e.g., email coming from IP addresses known to have behaved badly in the past, or one which is part of a block of addresses associated with bad actors, have a higher likelihood of being unacceptable), performing signature checks for a domain associated with the sender, performing content checks and limiting the number/rate of messages sent in accordance with known recipient policies. The rules may also include, for instance, monitoring the sender's overall reputation using metrics such as the overall behavior exhibited by the sender's domain, monitoring the number of recipients that report messages as unwanted/unacceptable, monitoring the number of recipients that unsubscribe from the sender's messages, and so on. In certain cases, the email delivery service may inform the sender about their reputations and in extreme cases, even decide to terminate the sender's access to the service based on the sender's reputation.

The filtering techniques described above are useful for processing conventional message streams that originate from a source (e.g., an organization) where the message streams tend to typically be highly heterogeneous in nature. For instance, for an organization such as a bank, the message streams may comprise a message indicating that a payment is due, followed by a highly personal message which is then followed by a message for a sales pitch for a new bank policy. Thus, legitimate email may be randomly embedded in a much larger stream (typically 10 times as large) of bulk/unacceptable email. In such cases, filtering is not only essential to the operation of the email delivery service, it has to be applied to every incoming message. However, commercial message streams have very different characteristics. Commercial message streams typically originate from known sources with known reputations, can be authenticated prior to email submission and typically consist of large groups of messages with nearly identical content. Existing email filtering solutions cannot be effectively applied to process large volumes of commercial email because screening every email message for its content prior to delivery to recipients can be a very expensive, computationally intensive, and time consuming process. In some instances, content scanning is so expensive that current email services that process commercial email may be forced to omit it entirely.

The cloud-based email message delivery system described in the present disclosure provides several technical advancements and/or improvements over conventional message delivery services by providing an improved email message filtering solution that selectively filters out email messages received as part of a commercial message stream prior to delivering the messages to their intended recipients. The selective filtering is performed by determining if an email message in a message stream is selected for sampling based on a sampling probability computed for a group associated with the email message. The selective filtering then involves scanning the contents of the selected email message. Based on the results of the content scanning, the disclosed process determines if the selected email message is to be filtered out or delivered to its intended recipient. By selectively sampling and scanning email messages that are received as part of a message stream, the disclosed email message filtering solution described herein enables the processing of high-volumes of commercial email messages in a cost effective, efficient, and time sensitive manner.

Referring now to the drawings, FIG. 1 depicts a computing environment that includes an email message delivery system (EMDS) that includes improved capabilities for filtering email messages prior to delivery to a set of recipients, according to certain embodiments. The EMDS 102 may be implemented by one or more computing systems that execute computer-readable instructions (e.g., code, program) to implement the EMDS 102. As depicted in FIG. 1, the EMDS 102 includes various systems and subsystems including a message transfer agent (MTA) 108 and a message filtering subsystem 116. The MTA 108 additionally comprises a queue manager 110 and an email communication subsystem 114. The message filtering subsystem 116 additionally comprises an email message grouping subsystem 118, an email message sampling subsystem 120 and an email message content scanning subsystem 122. Portions of data or information used by or generated by the MTA 108 and the message filtering subsystem 116 as part of its processing may be stored in various persistent memory data stores such as a group information data store 126 and a sampling history data store 132. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The computing environment 100 additionally comprises an email message recipient system (EMRS) 134 that is communicatively coupled to the EMDS 102 via one or more communication networks. The EMRS 134 may represent an email service (inbox) provider (e.g., Gmail®, Yahoo®, Microsoft® and so on) of the recipient of the email message. In certain examples, the recipient may be an end-user receiving legitimate commercial email messages (e.g., email messages comprising advertisements, sales content and the like) from the source(s) 104A-104N.

The EMDS 102 may be implemented in various different configurations. In certain embodiments, the EMDS 102 may be implemented on one or more servers of a cloud provider network and its email message delivery services may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the EMDS 102 can be implemented using more or fewer subsystems than those shown in FIG. 1, may combine two or more subsystems, or may have a different configuration or arrangement of subsystems.

In certain embodiments, the EMDS 102 provides a fast and reliable message delivery service for processing email messages by filtering out email messages (also referred to herein as messages or emails) based on selective sampling and content scanning of the email messages. The email messages may be generated by various source(s) 104A-104N. A source (e.g., 104A) may represent a system of an entity such as a customer (e.g., an organization, an enterprise, or an individual) of the cloud provider who subscribes to the services provided by the EMDS 102 for processing and delivering email messages to a set of recipients. In certain examples, the EMDS 102 may receive email messages from the source(s) 104A-104N for delivery to a set of recipients. By way of example, the email messages 105A, from a source, 104A, may comprise a high volume (e.g., billions) of solicited commercial emails (e.g., marketing emails, newsletters, coupons, invitations and the like) or transactional emails for delivery to a set of recipients. Each email message may be customized for delivery to a particular recipient in the set of recipients. As another example, the email messages from a source may comprise generic solicited commercial email messages sent by a user of the source for delivery to a set of recipients. As used herein, a user may refer to an end user, a business owner, or a marketing officer associated with a source (e.g., 104A) who interacts with the EMDS 102 to utilize the email delivery services provided by the EMDS 102.

In certain examples, a user associated with a source 104A may interact with the EMDS 102 using a user device that is communicatively coupled to the EMDS possibly via a public network 106 (e.g., the Internet). The user device may be of various types, including but not limited to, a mobile phone, a tablet, a desktop computer, and the like. For instance, a user may interact with the EMDS 102 using a user interface (UI) (which may be a graphical user interface (GUI)) of an application executed by the user device. The interaction may involve, for instance, setting up, by the user (e.g., an administrator of the organization), via the UI, authentication credentials as well as various configuration parameters for enabling users of the organization to interact with the EMDS 102. For instance, the user may, via the UI, set up an approved sender list (by identifying the "From:" addresses of all its users sending email in its organization), request to create a pool of source IP addresses to be used to identify the users of its organization, set up a communication protocol (e.g., Simple Mail Transfer Protocol (SMTP)) and user credentials for its users to send email via the EMDS 102, specify a limit on the maximum number of outbound connections that can be concurrently supported by a source IP address (i.e., the maximum number of outbound connections that the IP address can have open to a single recipient domain at a time), specify a message limit on the number of messages that can be sent across a single connection to the recipient's domain and so on.

After configuring the EMDS 102 as described above, an end-user of a customer (also referred to herein as a sender) associated with a source (e.g., 104A) may, via the user device, send email message(s) to the EMDS 102 for delivery to a set of one or more recipients. In certain examples, the end user may utilize an email client application (e.g., a mail user agent) installed in the user's device to compose an email message. The mail user agent (MUA) may format the email message in a suitable format prior to submission to the EMDS 102. In certain examples, the MUA may utilize a submission protocol (e.g., SMTP, HTTP or other protocols) to transmit the message to the EMDS 102. The email message(s) may initially be received by a queue manager 110 within the MTA 108 which is configured to store the received email message(s) in an email message queue 112. As described herein, an MTA may be a network element (e.g., a mail sever) within the EMDS 102 that is configured to receive email messages from the various sources and forward the email messages to the proper end-users or destination. The messages received by the MTA for processing are queued in the email message queue 112 of the MTA 108. New email messages are typically added to the end or tail of the message queue and email messages are picked up for processing by the MTA from the start or head of the queue. In certain embodiments, the MTA 108 may include a queue manager 110 that is responsible for performing tasks related to managing the MTA email message queue 112 including performing tasks such as adding messages to the queue, selecting a message from the queue for processing, and the like. An MTA message queue 112 may include email messages from multiple different senders and the email messages could be directed to different recipients.

The MTA 108 receives the email messages and adds the messages to its message queue 112 for subsequent processing and filtering by the message filtering subsystem 116. When a certain number of messages (e.g., a batch of email messages) have been received and stored in the message queue 112, the MTA begins transmitting the messages stored in its message queue 112 to the message filtering subsystem 116 for further processing. The message filtering subsystem 116 processes the email message(s) stored in the message queue 108 prior to transmitting them to the EMRS 134 for delivery to the intended recipients. In certain examples, the processing performed by the message filtering subsystem 109 may involve filtering the email messages by selectively sampling and scanning the email messages. Based on the results of the processing, the message filtering subsystem 116 makes a decision regarding whether or not an email message is to be delivered to its intended recipient(s). If it is determined that the email message is not to be delivered, the message filtering subsystem 116 transmits an instruction to the queue manager 110 in the MTA 108 to filter out/drop the email message from its email message queue. If it is determined that the email message should be delivered, the message filtering subsystem 116 transmits an instruction to the queue manager 110 to relay the email message to the email communication subsystem 114 for delivery to the recipient's system 134.

The MTA periodically attempts to send the messages stored in its message queue to the end-users (recipients) or destination until its message queue is empty. If a recipient's server does not respond, the MTA recurrently tries to send the email message to the recipient. If the email message fails to be delivered during a specific time period (e.g., a certain number of days) the MTA returns the email message to the host (sender of the message). Additional details related to the processing performed by the various systems and subsystems in FIG. 1 for processing email messages are described below with respect to the flowchart depicted in FIGS. 2-4 and their accompanying description.

Figure 2:
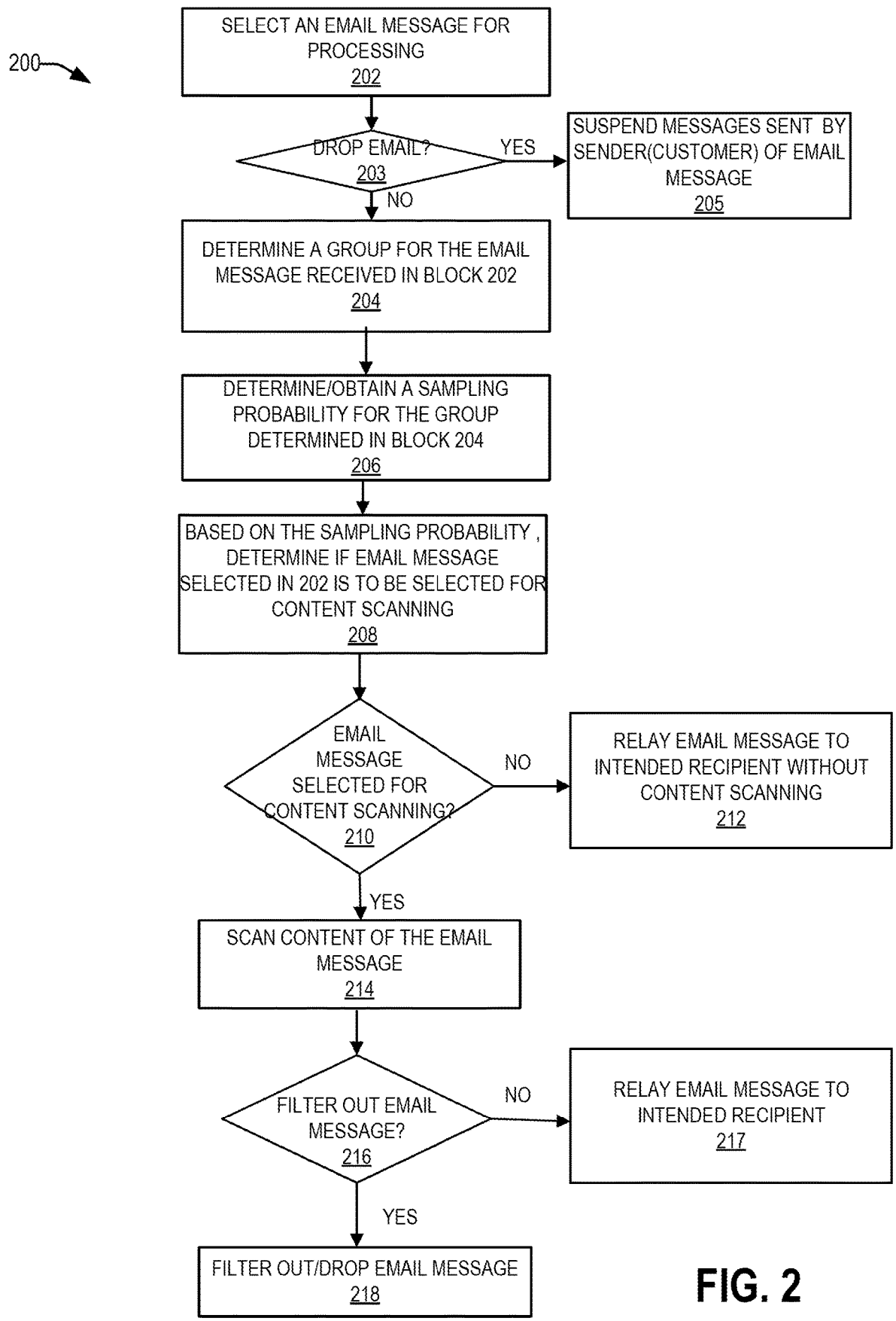
FIG. 2 depicts an example of a process by which email messages are processed by the Email Message Delivery System (EMDS) shown in FIG. 1 prior to delivery, according to certain embodiments.

FIG. 2 depicts an example of a process 200 by which email messages are processed by the EMDS shown in FIG. 1, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the message filtering subsystem 116. In certain embodiments, within the message filtering subsystem 116, the processing may be performed by one or more subsystems such as the email message grouping subsystem 118, the email sampling subsystem 120 and the email message content scanning subsystem 122 of the message filtering subsystem 116.

The processing depicted in FIG. 2 assumes that the EMDS 102 has received a set of email messages that are to be delivered to their intended recipients. The email messages may be received from one or more different customers or subscribers of the email delivery service provided by the EMDS. The received email messages are then forwarded to the MTA 108 of the EMDS 102 for processing. In the MTA 108, the email messages received by the MTA for processing are queued in an email message queue 112 of the MTA 108. As previously described, an MTA message queue may include email messages from multiple different customers (senders) and the email messages could be directed to different recipients. For example, in the embodiment depicted in FIG. 1, the EMDS 102 may receive email messages from multiple customers. The email messages are received by the MTA 108 for processing and may be queued in the email message queue 112 of the MTA 108.

The processing depicted in FIG. 2 may be initiated when, at block 202, an email message is selected from the head of the message queue for processing by the MTA 108. For the email message selected in 202, the MTA determines the sender and the intended recipient for the selected email message. Each email message contains multiple fields, such as a "FROM" field that identifies a user associated with the sender of the email message, a "TO" field that identifies the intended recipient of the email message, a "BODY" field that contains the contents of the email, and the like. As part of the processing in 202, the MTA may parse the selected email message to determine a user of the email message from the "FROM" field of the email message and an intended recipient of the email message from the "TO" field. In certain implementations, the MTA may parse the string in the "FROM" field to determine the user associated with the sender who is authorized to send the email message. For example, the "FROM" field may contain a string in the format: "user1@abccompany.com". Here, "user1" may identify a user associated with the sender of the email message. The portion of the string after the "@" symbol identifies a domain name or a fully qualified domain name associated with the sender. MTA may identify the sender for the email message based upon the domain name. For the user1@abccompany.com example, the sender may be identified as ABC Company.

In certain examples, after determining the sender for the email message, the MTA may initiate authorization processing based on prior authentication to determine a list of all possible FROM addresses that the sender is authorized to use. The MTA then checks the messages from the sender to make sure they have used authorized FROM addresses. In certain embodiments, a check may also be made to see if the sender is authorized to send email messages to the domain corresponding to the "TO" field of the email message.

At block 203, based upon the sender determined for the message selected in 202, the MTA 108 performs a check to determine if the selected email message is to be dropped. For instance, the MTA 108 may determine, based on the IP reputation of the sender (i.e., customer) of the email message or the content of the email message that the message should be dropped. The determination of whether the email message should be dropped may also be determined based upon an action determined by the MTA 108 as a result of processing prior email messages from the sender. For instance, as a result of processing prior email messages from the sender, if the MTA 108 determines that one or more email messages were filtered out, then any subsequent email messages received from the sender are dropped without further processing. If the MTA 108 determines that the email message should be dropped, at block 205, the MTA 108 immediately suspends message sending by the sender and flushes any messages that have been queued for the customer (sender) in the message queue. Thus, the disclosed system additionally includes capabilities to prevent a sender from submitting additional problematic messages as well as to get rid of any such messages that have already been queued in the system.

If at block 203, the MTA 108 determines that the email message selected in block 202 can be processed, at block 204, the email message grouping subsystem 118 determines a group for the received email message. A group for the email message may be determined using various criteria such as metadata associated with the email message and a set of rules 124 (also referred to herein as grouping rules) defined by the EMDS 102. In certain examples, each group may be associated with a particular customer (sender) of the electronic message. In certain examples, the email message grouping subsystem 118 may create multiple groups for single customer/sender. Details related to the processing performed by the email message grouping subsystem 118 for determining a group for an email message are described in FIG. 3 and its accompanying description.

In certain embodiments, the email message grouping subsystem 118 is also configured to store state information 128 associated with each group. The state information 128 may include information that describes the characteristics of a group such as the reputation of the sender associated with the group, the number of emails that have previously been filtered out from the group for that sender, the number of emails that have previously been scanned for the group, the newness of a sender, compliance rules specific to the sender associated with the group and so on. In certain examples, the email message grouping subsystem 118 may be configured to store information associated with groups along with their associated state information in a group information data store 126 within the EMDS 104. By way of example, the group information data store 126 may store group information for multiple different senders (customers) along with the state information for each group. For instance, as depicted in FIG. 1, the group information for a sender S1 may be represented as (G1, S1) and (G2, S2) consisting of two groups G1, G2 with associated state information S1, S2.

At block 206, the email message sampling subsystem 120 determines/obtains a sampling probability computed for the group. In certain examples, the sampling probability refers to a probability (n/N) of a particular message being selected as a sample, where n is the sample size and N is the size of the group (population). Details related to the processing performed by the email message sampling subsystem 120 to compute a sampling probability for a group to which an email message is added to is described in FIG. 5 and its accompanying description.

At block 208, the processing involves determining if the email message is to be selected for content scanning based on the sampling probability determined in block 206. In certain examples, the processing in block 208 may additionally involve, obtaining, by the email message sampling subsystem 120, sampling history information associated with the group determined in block 204 to identify a previously received email message in the group that was selected for scanning. The sampling history information may be used by the email message sampling subsystem 120 to identify and/or track the email messages within the group that have already been sampled and/or have already been selected for content scanning in order to determine whether the newly received message has to be selected for sampling and content scanning. In certain examples, the sampling history information associated with various groups of email messages may be stored in the sampling history data store 132 within the EMDS 104. Based on the processing described in 208, a message can be selectively selected for content scanning based on the sampling probability. Thus, the disclosed process enables the processing of large volumes of email messages in a cost effective, efficient, and time sensitive manner by avoiding the need to perform a full content scan of every message.

At block 210, the email message sampling subsystem 112 performs a check to determine if the email message has been selected for content scanning. If the email message has been selected for content scanning, the email message sampling subsystem 120 transmits the email message to the email message content scanning subsystem 122. At block 214, the email message content scanning subsystem 122 performs processing to scan the contents of the email message. Additional details related to the processing performed by the email message content scanning subsystem 122 is described in FIG. 4 and its accompanying description.

At block 216, the email message content scanning subsystem 122 determines whether the email message should be filtered out based on the results of the content scanning performed at block 214. If the email message needs to be filtered out, at block 218, the email message content scanning subsystem 122 transmits an instruction to the queue manager 110 in the MTA 108 to filter/drop the email message from its email message queue 112. If the email message does not need to be filtered out, the email message is relayed to the intended recipient at block 217.

At block 210, if it is determined that the email message has not been selected for content scanning, at block 212, the email message sampling subsystem 112 transmits an instruction to the queue manager 106 to relay the email message to its intended recipient without content scanning.

Figure 3:
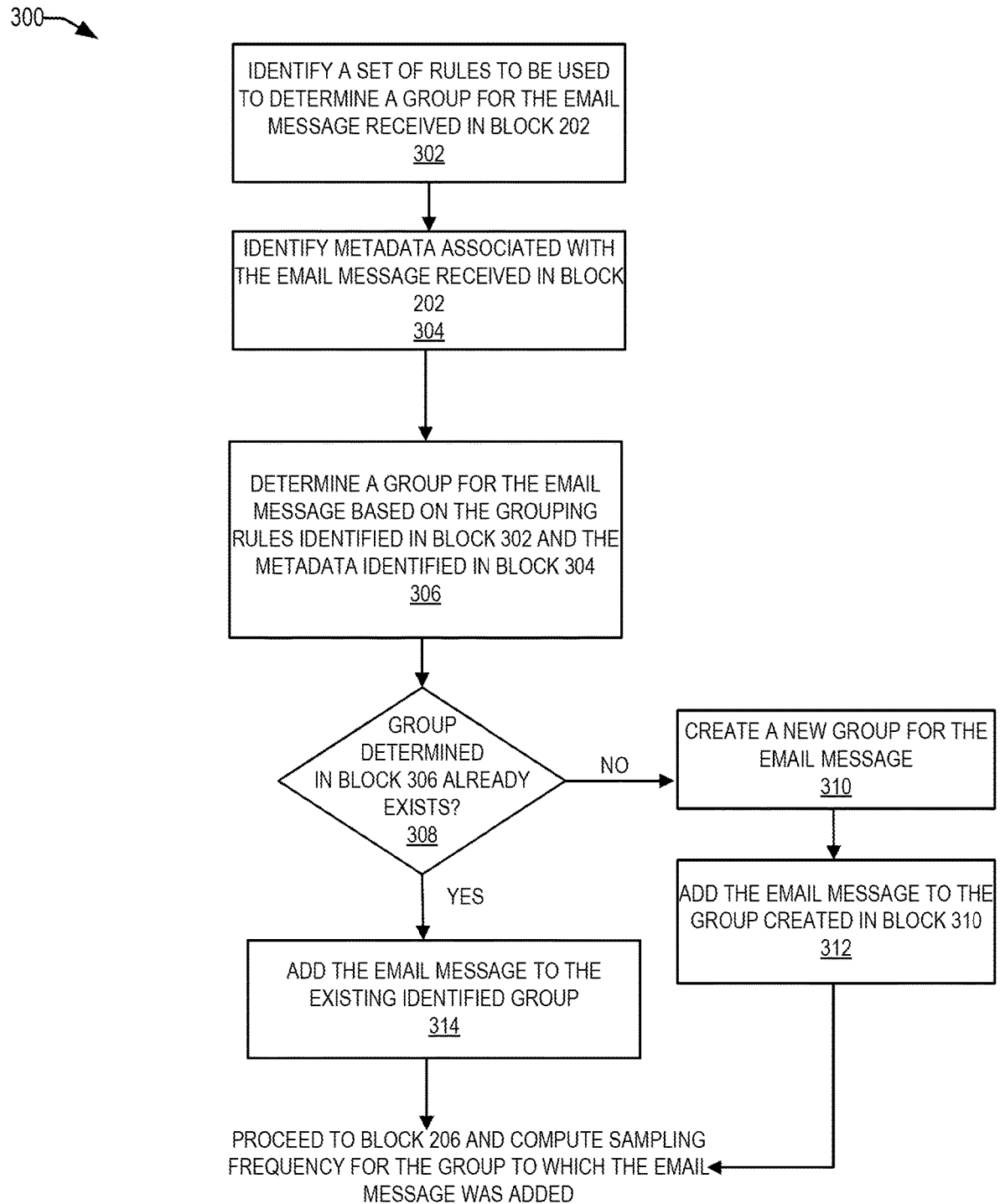
FIG. 3 depicts an example of a process by which email messages are grouped by the Email Message Delivery System (EMDS) shown in FIG. 1, according to certain embodiments.

FIG. 3 depicts an example of a process 300 by which email messages are grouped by the EMDS shown in FIG. 1, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by the email message grouping subsystem 118 of the message filtering subsystem 116.

In the embodiment depicted in FIG. 3, processing is initiated at block 302 when the email message grouping subsystem 118 identifies a set of grouping rules 124 to be used to determine a group for the email message selected for processing in block 202. In certain examples, the grouping rules 124 may be defined by a user (e.g., an administrator) of the EMDS 102 based on analyzing the metadata associated with messages previously received and processed by the EMDS 102. By way of example, metadata associated with an email message may include, but is not limited to, the customer (sender) associated with the email message, the size of the email (which may include the size of the body of the email and the size of any email attachments) associated with the email message, and so on. For instance, a high volume of email messages originating from a specific advertisement campaign of a sender of the message may all be within a certain size range and hence grouped together into a single group for the sender. In certain examples, a grouping rule may define a set of one or more conditions/criteria (in the form of if-then rules) to be applied on the metadata of an email message for classifying an email message into a particular group. By way of example, a grouping rule generated based on a combination of a sender of the email message and the size of the email message may take the following form:

Grouping Rule: If sender is =S1 and size of the email message is in a range of (100 kb-200 kb), classify the email message into a first group for the sender S1.

At block 304, the email message grouping subsystem 118 identifies metadata associated with the email message selected for processing in block 202. At block 306, the email message grouping subsystem 118 determines a group for the email message based on the grouping rules identified in block 302 and the metadata identified in block 304. As an example, based on analyzing metadata (e.g., sender, size of the email) associated with the email message and a set of grouping rules, the email message grouping subsystem 110 may classify the email message into a first group for the sender.

At block 308, the email message grouping subsystem 118 performs a check to determine if the group determined in block 306 already exists. If the group exists, at block 314, the email message grouping subsystem 118 adds the email message to the existing identified group and proceeds to perform the processing in block 206 to compute a sampling probability for the group to which the email message was added.

If the group does not exist, at block 310, the email message grouping subsystem 118 creates a new group for the email message. In certain examples, the group (along with its state information) is associated with the customer (sender) of the email message and stored in the group information data store 126.

At block 312, the email message grouping subsystem 118 adds the email message to the group created in block 310 and proceeds to perform the processing in block 206 to compute a sampling probability for the group to which the email message was added.

Figure 4:
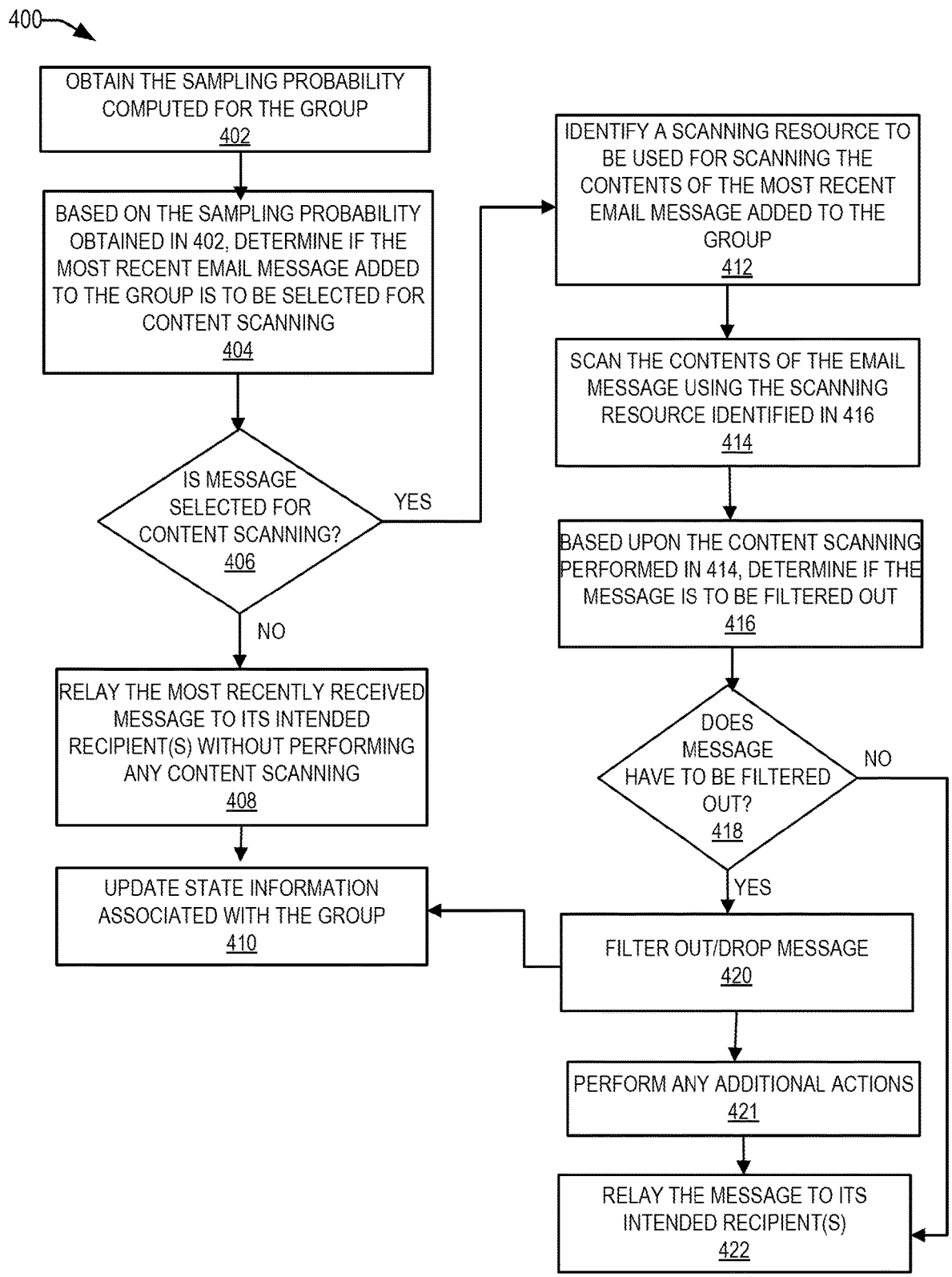
FIG. 4 depicts an example of a process for performing sampling-related processing and content scanning of email messages by the Email Message Delivery System (EMDS) shown in FIG. 1, according to certain embodiments.

FIG. 4 depicts an example of a process 400 for performing sampling-related processing and content scanning of email messages by the EMDS shown in FIG. 1, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by the email message sampling subsystem 120 and the email message content scanning subsystem 122 of the message filtering subsystem 116.

In the embodiment depicted in FIG. 4, processing is initiated at block 402 when the email message sampling subsystem 120 obtains a sampling probability computed for a group. Details related to the processing performed by the email message sampling subsystem to compute a sampling probability for a group is described in FIG. 5 and its accompanying description.

At block 404, the email message sampling subsystem 120 determines if the most recent email message added to the group is to be selected for content scanning, based on the sampling probability obtained in block 402. The process at block 404 may additionally involve utilizing, by the email message sampling subsystem 120, sampling history information associated with the group. As previously described, the sampling history information may be used by the email message sampling subsystem 120 to determine and/or track the email messages within the group that were previously sampled and/or selected for content scanning in order to determine whether the newly received message has to be selected for sampling and content scanning. In certain examples, the sampling history information associated with various groups of email messages may be stored in the sampling history data store 132 within the EMDS 102.

At block 406, if the email message sampling subsystem 120 determines that the most recent email message added to the group is not to be selected for content scanning, at block 408. the email message sampling subsystem 120 relays the most recently received email message to its intended recipient(s) without performing any content scanning and at block 410 updates the state information associated with the group. The process at block 406 may involve transmitting, by the email message sampling subsystem 120, an instruction to the queue manager 110 to relay the email message to the email communication subsystem 114 for delivery to the recipient's system 134.

At block 406, if the email message sampling subsystem 120 determines that the most recent email message added to the group is selected for content scanning, the processing proceeds to block 412 where the email message content scanning subsystem 122 identifies a scanning resource to be used for scanning the contents of the most recent email message added to the group. At block 414, the email message content scanning subsystem 122 scans the contents of the email message using the scanning resource identified in block 412.

At block 416, the email message content scanning subsystem 122 determines if the email message needs to be filtered out based on the results of the content scanning performed in block 414. At block 418, if it is determined that the email message needs to be filtered out, then at block 420, the email message content scanning subsystem 122 transmits an instruction to the queue manager 110 to drop the email message from its queue 112 and updates the state information associated with the group. In certain embodiments, at block 421, the email message content scanning subsystem 122 may perform additional actions on the filtered email message. For instance, an action may involve transmitting an instruction to the queue manager 110 to drop subsequent email messages received by the sender without processing them. As another example, an action may involve entirely suspending the customer's rights to send additional messages.

If it is determined that the email message does not need to be filtered out, at block 422, the email message content scanning subsystem 122 transmits an instruction to the queue manager 110 to relay the email message to the email communication subsystem 114 for delivery to the recipient's system 134 and updates the state information associated with the group.

Figure 5:
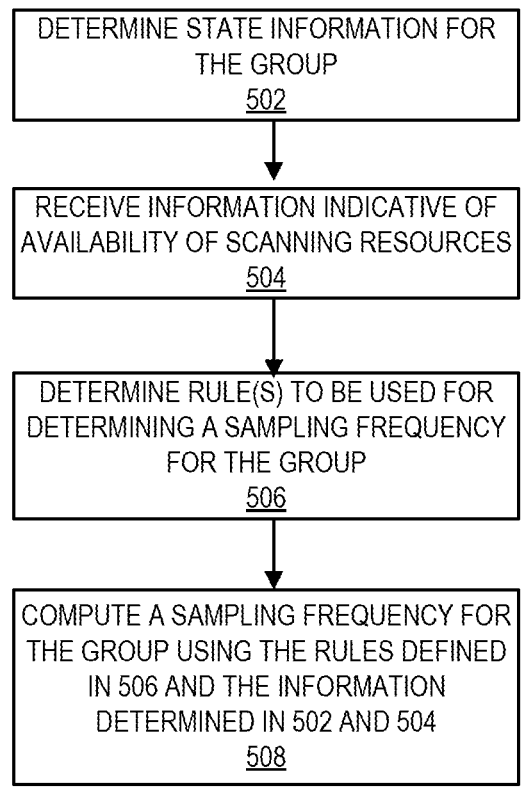
FIG. 5 depicts an example of a process for computing the sampling probability for a group, according to certain embodiments.

FIG. 5 depicts an example of a process 500 of the processing performed by the EMDS shown in FIG. 1 to compute a sampling probability for a group, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 5 may be performed by the email message sampling subsystem 120 of the message filtering subsystem 116 to compute a sampling probability for a newly created group. In certain embodiments, the processing depicted in FIG. 5 may also be performed to re-compute the sampling probability for a group when certain pre-determined conditions are satisfied (e.g., after a certain number of email messages have been added to the group, after a certain amount of time etc.).

In certain embodiments, as part of the processing performed to compute a sampling probability for a group, at block 502, the email message sampling subsystem 120 determines/obtains the state information 128 for the group. As previously described, the state information 128 may include, but is not limited to, the reputation of the sender associated with the group, the number of emails that have previously been filtered out from the group, the number of emails that have previously been scanned in the group, the newness of a customer/sender, compliance rules specific to the customer (sender) associated with the group and so on.

At block 504, the email message sampling subsystem 120 receives information indicative of the availability of scanning resources for scanning the content of the email message. Scanning resources may include, for instance, content scanning engines that use heuristic rules to scan/screen the content of the email message before delivering it to the intended recipients.

At block 506, the email message sampling subsystem 120 determines the rule(s) to be used for determining a sampling probability for the group. For instance, a sampling rule may specify that every email message received (or the first "M" email messages received) should be sampled and scanned for a newly created group whereas for a group where a certain number of email messages have already been sampled and scanned, the sampling probability may be reduced by a certain percentage. The sampling rules may also be determined using a variety of additional criteria, including, but not limited to, performing more sampling and scanning for less trusted customers and/or customers who haven't recently used the email delivery services provided by the EMDS, performing less scanning for subsequent messages that are part of a group and so on. In certain approaches, most or even all messages sent by a brand new customer may be scanned because such customers may typically only send a limited number of messages. Criteria specified by the sampling rules may also be derived based on the availability of scanning resources (e.g., if the scanning rate is nowhere near capacity, scanning is almost always performed), and the scanning cost. For instance, the scanning cost may depend on the size of the messages (assuming reasonable scanner behavior, there may be no reason not to scan really small messages unconditionally).

At block 508, the email message sampling subsystem 120 computes a sampling probability for the group using the rules defined in block 506 and the information determined in blocks 502 and 504. As described herein, the sampling probability refers to a probability (n/N) of a particular message being selected as a sample, where n is the sample size and N is the size of the group (population). In certain approaches, the sampling probability can be represented as a Bernoulli distribution, which is a discrete probability distribution of a random variable which takes the value 1 with probability $p=n/N$ and the value 0 with probability $q=1-p$ or less. In this implementation, the sampling probability can be formulated as a model for the set of possible outcomes of any single experiment that asks a yes-no question, the mean is the sampling probability p and the variance is $p*q$, which cannot exceed 14 implying that the sampling is likely to be fair.

For example, based on random sampling, for a group size of N=100 and a sampling probability of 0.5, each of the 100 messages have a 50% chance of being sampled. In other words, for a sampling probability of 0.5, a mean of 50 samples out of 100 samples may be obtained. If the digit "1" is used to indicate a sampled message and "0" is used to indicate a message that is not sampled, the 50 sampled messages could take the form, 11100000 . . . or 1010-001 . . . , as long as the mean of the sampled messages is 50/100. For a sampling probability of 0.25, each of the 100 messages have a ¼ (25%) chance of being sampled. This means that 25 messages out of 100 messages have a chance of being sampled. If p=0.25 and q=0.75, then the mean over a large number of messages would be 0.25 which implies that a quarter of the messages have a chance of being sampled. If the sampling probability is 1, then all messages have a chance of being sampled.

For instance, the email message sampling subsystem 120 may compute, based on the state information associated with the group, the grouping rules and the availability of scanning resources, that the sampling probability for a newly created group should be 100% (i.e., all messages have a chance of being sampled). On the other hand, the email message sampling subsystem 120 may compute a 50% sampling probability for a group where a certain number of email messages have already been sampled and scanned. As previously noted, a sampling probability of 50% for a group indicates that each message in the group has a 50% chance of being sampled.

In certain embodiments, such as in the embodiment depicted in FIG. 1, the MTA 108 may be configured with a filter application (also referred to as a "milter"). The milter may be configured to notify the message filtering subsystem 116 about each phase of the delivery of a message, from initial connection through completion of transmission. At each phase of the session, the filter application may be given data about the arriving message and then has an opportunity to terminate acceptance of the message early when appropriate. For very large messages, this can have an enormous impact when a decision to reject an email message can be made as early as possible. The milter may be designed so it can be operated in lockstep with a communication protocol (e.g., SMTP protocol) used by the email delivery service, with data flowing directly from the SMTP connection to the filter. However, in alternate approaches, the MTA may be configured to operate milters sequentially. In particular, since the size of a message can be critical in determining whether or not to apply a content filter, the MTA can buffer the entire message before sending any of it to the message filtering subsystem via the milter, and if the determination is that content scanning is not needed, the milter can be aborted simply by closing the connection.

The cloud-based email message delivery system described in the present disclosure provides several technical advancements and/or improvements over conventional message delivery services by providing an improved email message filtering solution that selectively filters out email messages received as part of a commercial message stream prior to delivering the messages to their intended recipients. The selective filtering is performed by determining if an email message in a message stream is selected for sampling based on a sampling probability computed for a group associated with the email message. The selective filtering then involves scanning the contents of the selected email message. Based on the results of the content scanning, the disclosed process determines if the selected email message is to be filtered out or delivered to its intended recipient. By selectively sampling and scanning email messages that are received as part of a message stream, the disclosed email message filtering solution described herein enables the processing of high-volumes of email messages in a cost effective, efficient, and time sensitive manner.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
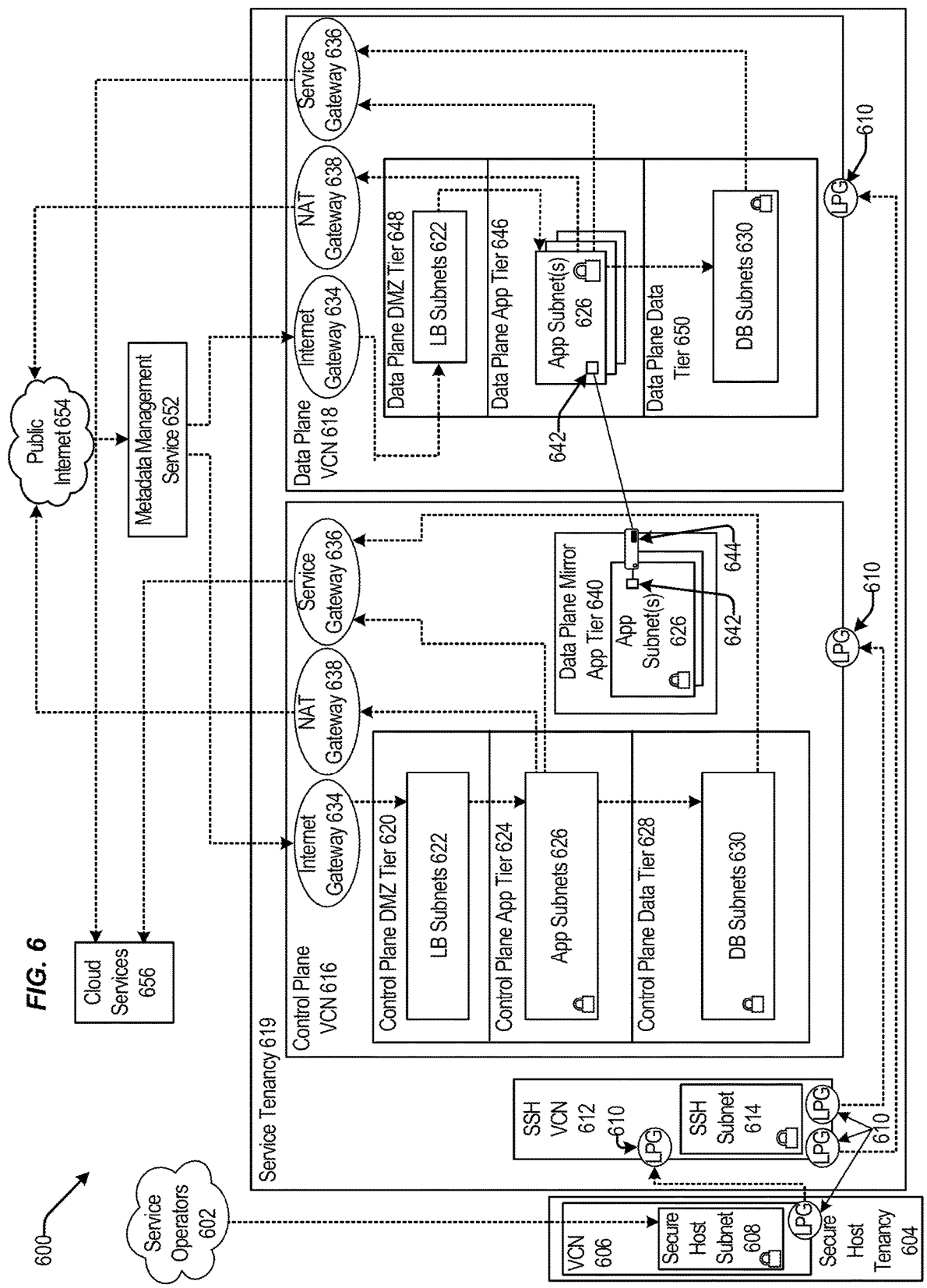
FIG. 6 is a block diagram illustrating an example pattern of an IaaS architecture, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
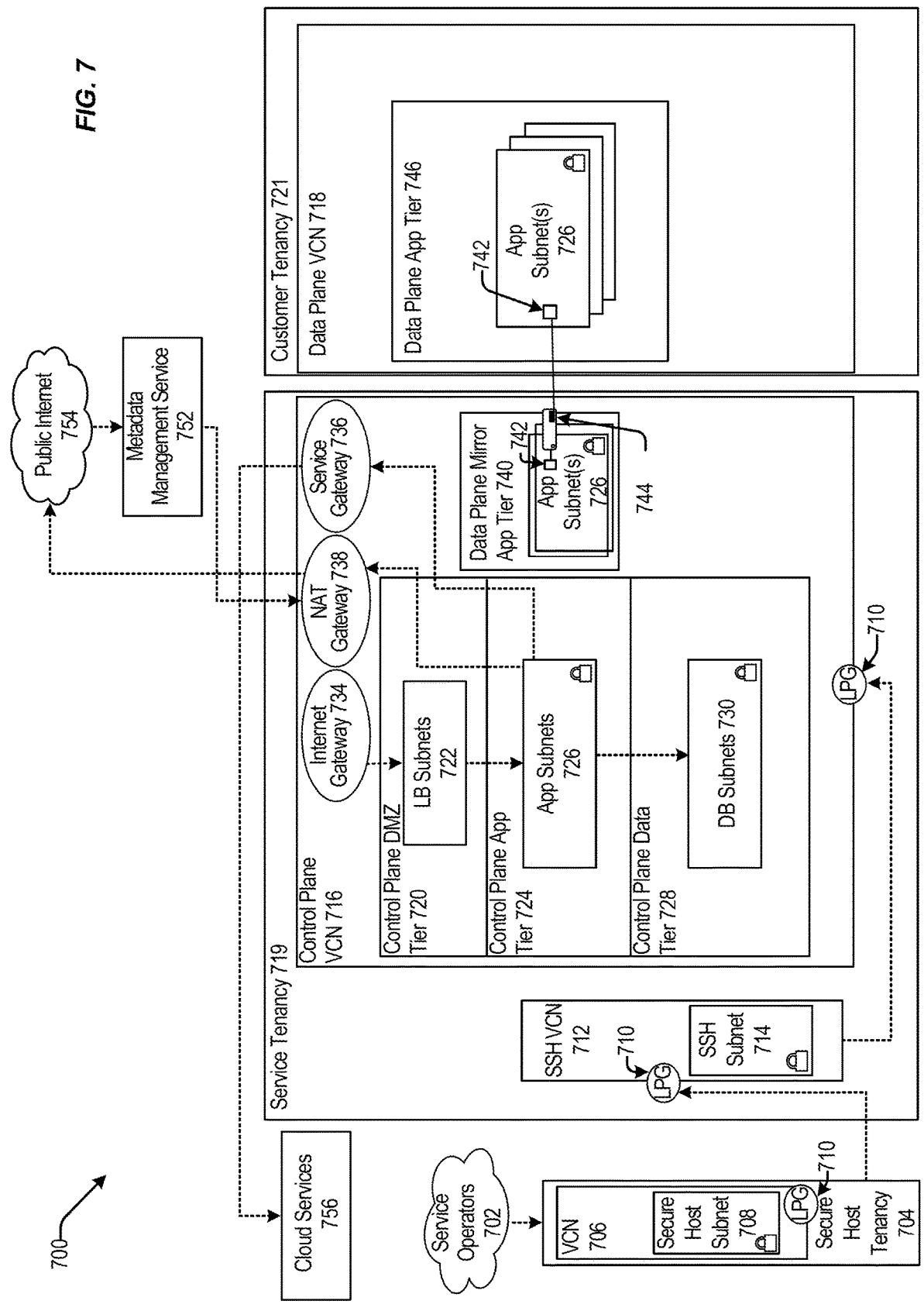
FIG. 7 is a block diagram illustrating another example pattern of an IaaS architecture, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
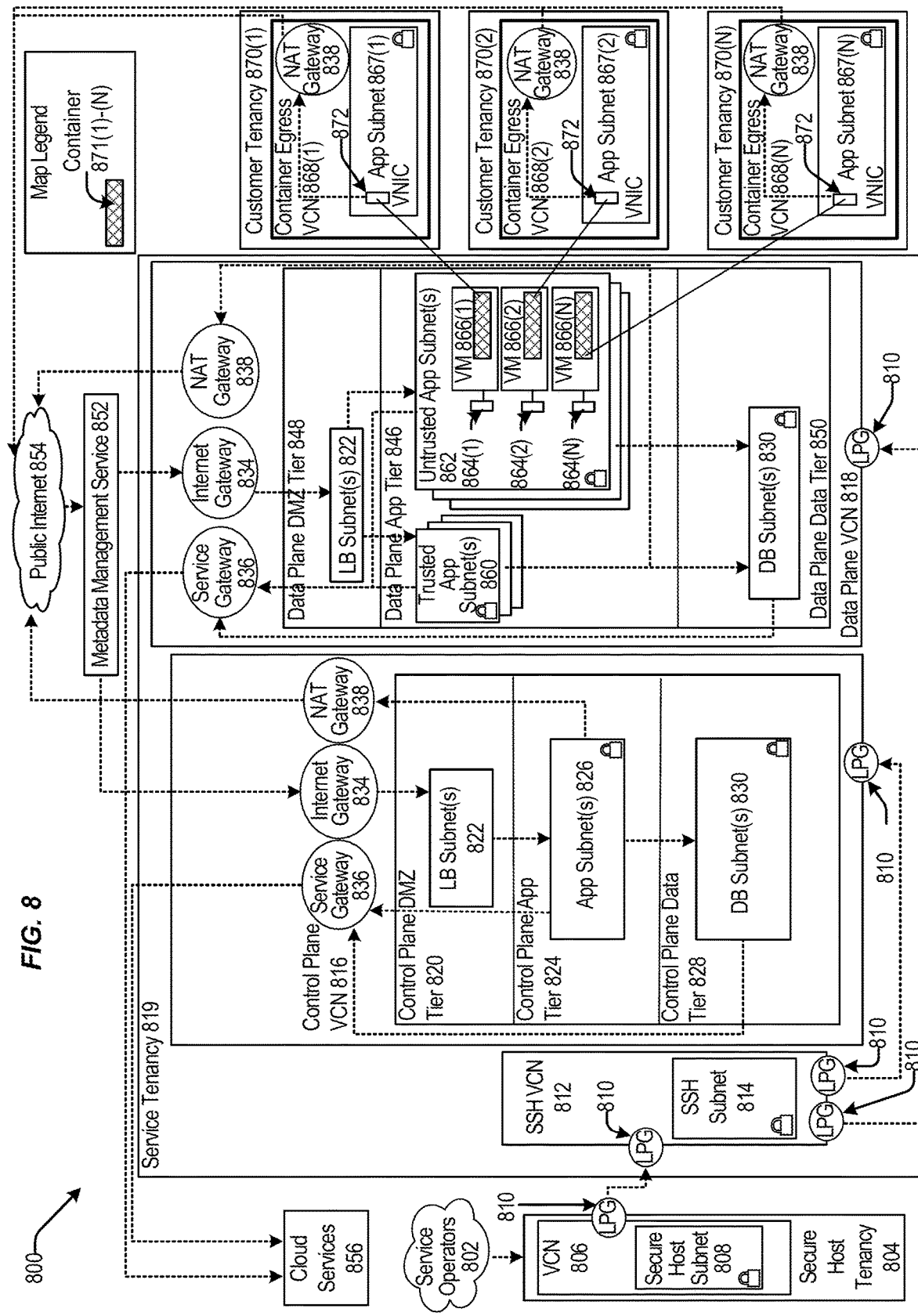
FIG. 8 is a block diagram illustrating another example pattern of an IaaS architecture, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
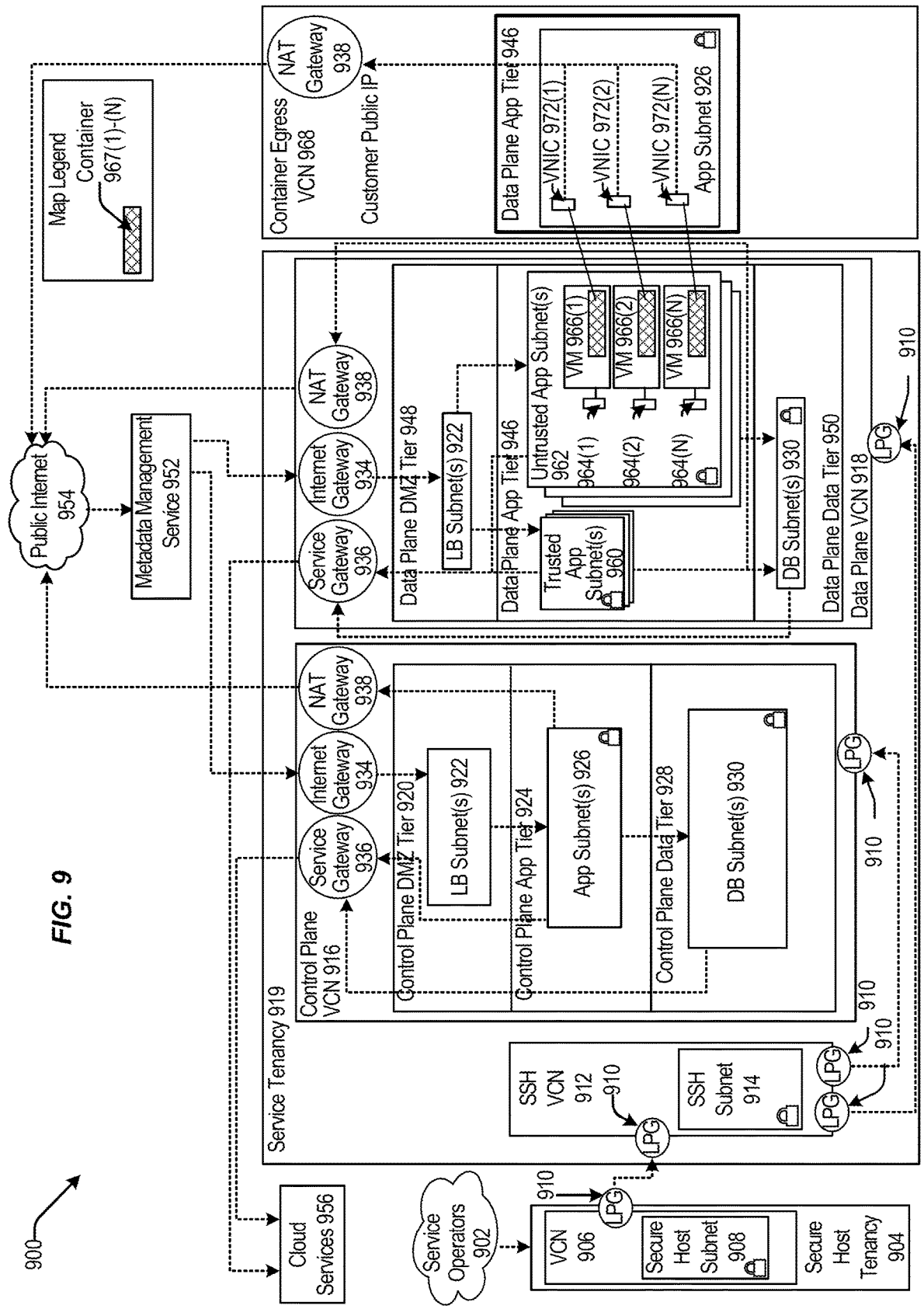
FIG. 9 is a block diagram illustrating another example pattern of an IaaS architecture, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
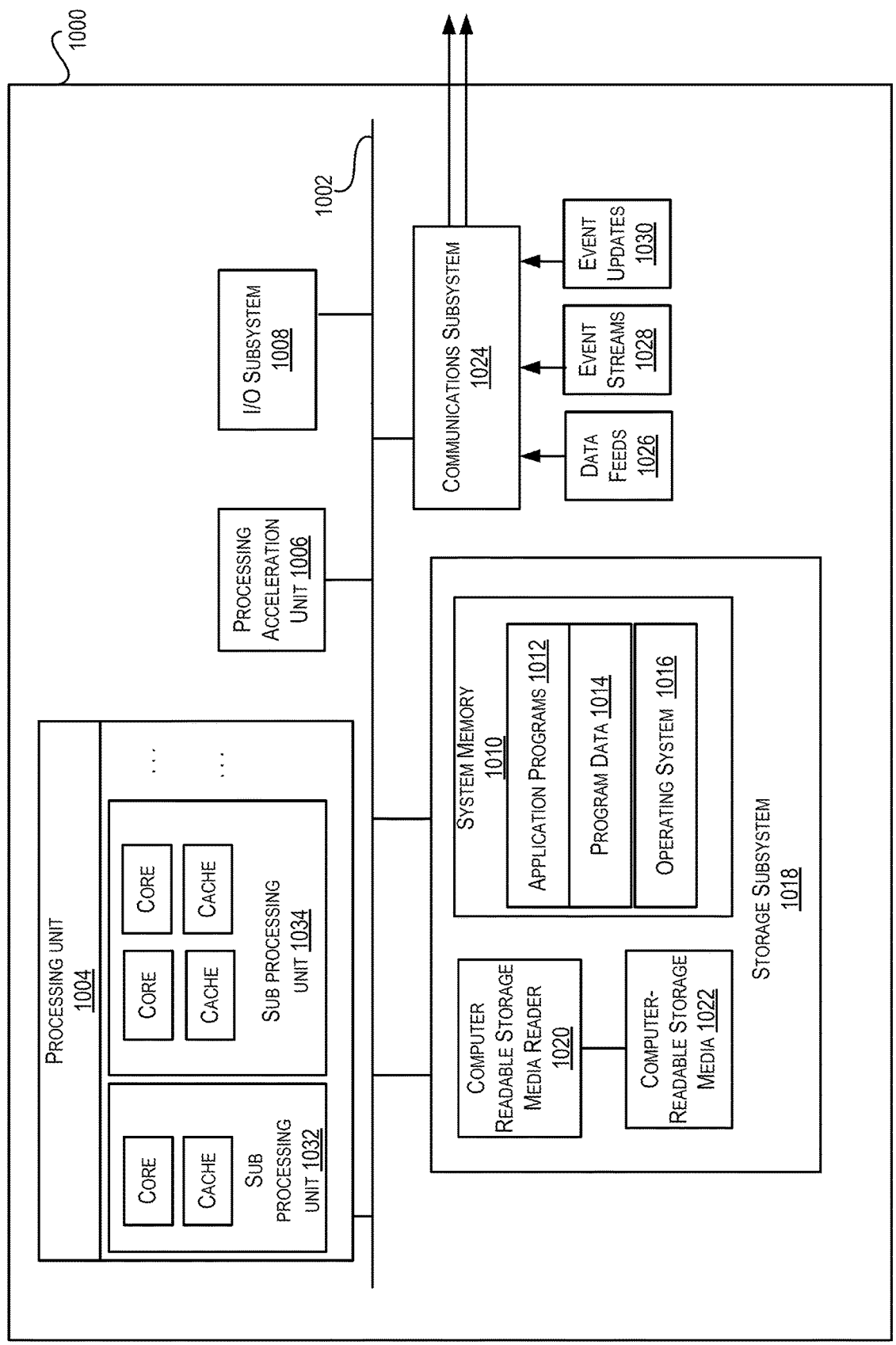
FIG. 10 illustrates an example computer system, in which various embodiments may be implemented.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   selecting, by an email message delivery system providing an email message delivery service, an email message for processing from a message queue of the email message delivery system, the message queue comprising a plurality of email messages received from a plurality of senders, the plurality of senders corresponding to a plurality of subscribers of the email message delivery service;
   determining, by the email message delivery system, a group for the email message from a plurality of groups, each group in the plurality of groups associated with a sampling probability computed for the group;
   determining, by the email message delivery system, the sampling probability for the group;
   based at least in part on the sampling probability determined for the group, determining, by the email message delivery system, whether the email message is selected for scanning based on a sampling history associated with the group, the sampling history identifying a previously received email message that was selected for scanning in the group;
   responsive to determining that the email message is selected for scanning, scanning, by the email message delivery system, content of the email message;
   determining, by the email message delivery system, based on the scanning, whether the email message is to be filtered out; and
   responsive to determining that the email message is not to be filtered out based on the scanning, relaying, by the email message delivery system, the email message for delivery to the recipient.

2. The method of claim 1, further comprising determining, by the email message delivery system, that the email message is to be filtered out based on the scanning and responsive to the determining, dropping, by the email message delivery system, the email message from the message queue.

3. The method of claim 1, further comprising determining, by the email message delivery system, that the email message is not selected for scanning based at least in part on the sampling probability and responsive to the determining, relaying the email message for delivery to the recipient without scanning the email message.

4. The method of claim 1, wherein determining the group for the email message comprises:
   identifying a set of one or more grouping rules for a sender associated with the message;
   identifying metadata associated with the email message; and
   determining the group for the email message based at least in part on the set of one or more grouping rules and the metadata.

5. The method of claim 4, wherein the metadata comprises at least one of the sender associated with the email message or a size of the email message.

6. The method of claim 1, wherein the sampling probability for the group is determined based on at least one of state information associated with the group, availability of a set of one or more scanning resources for scanning the content of the email message, or a set of one or more sampling rules.

7. The method of claim 6, wherein the state information associated with the group comprises at least one of a reputation of a sender associated with the group, the number of emails that have previously been filtered out from the group, the number of emails that have previously been scanned for the group, or compliance rules specific to a sender associated with the group.

8. The method of claim 1, wherein scanning, by the email message delivery system, the content of the email message comprises identifying a scanning resource to be used for scanning the content of the email message and scanning the content of the email message using the scanning resource.

9. An email message delivery system providing an email message delivery service, comprising:
   a memory; and
   one or more processors configured to perform processing, the processing comprising:
      selecting, by the email message delivery system, an email message for processing from a message queue, the message queue comprising a plurality of email messages received from a plurality of senders, the plurality of senders corresponding to a plurality of subscribers of the email message delivery service;
      determining, by the email message delivery system, a group for the email message from a plurality of groups, each group in the plurality of groups associated with a sampling probability computed for the group;
      determining, by the email message delivery system, the sampling probability for the group;
      based at least in part on the sampling probability determined for the group, determining, by the email message delivery system, whether the email message is selected for scanning based on a sampling history associated with the group, the sampling history identifying a previously received email message that was selected for scanning in the group;
      responsive to determining that the email message is selected for scanning, scanning, by the email message delivery system, content of the email message;
      determining, by the email message delivery system, based on the scanning, whether the email message is to be filtered out; and
      responsive to determining that the email message is not to be filtered out based on the scanning, relaying, by the email message delivery system, the email message for delivery to the recipient.

10. The system of claim 9, further comprising determining, by the email message delivery system, that the email message is to be filtered out based on the scanning and responsive to the determining, dropping, by the email message delivery system, the email message from the message queue.

11. The system of claim 9, further comprising determining, by the email message delivery system, that the email message is not selected for scanning based at least in part on the sampling probability and responsive to the determining, relaying the email message for delivery to the recipient without scanning the email message.

12. The system of claim 9, wherein determining the group for the email message comprises:
   identifying a set of one or more grouping rules for a sender associated with the message;
   identifying metadata associated with the email message; and
   determining the group for the email message based at least in part on the set of one or more grouping rules and the metadata.

13. The system of claim 9, wherein the sampling probability for the group is determined based on at least one of state information associated with the group, availability of a set of one or more scanning resources for scanning the content of the email message, or a set of one or more sampling rules.

14. The system of claim 9, wherein scanning, by the email message delivery system, the content of the email message comprises identifying a scanning resource to be used for scanning the content of the email message and scanning the content of the email message using the scanning resource.

15. A non-transitory computer-readable medium having program code that is stored thereon, the program code executable by one or more processing devices for performing operations comprising:
   selecting, by the email message delivery system, an email message for processing from a message queue, the message queue comprising a plurality of email messages received from a plurality of senders, the plurality of senders corresponding to a plurality of subscribers of the email message delivery service;
   determining, by the email message delivery system, a group for the email message from a plurality of groups, each group in the plurality of groups associated with a sampling probability computed for the group;
   determining, by the email message delivery system, the sampling probability for the group;
   based at least in part on the sampling probability determined for the group, determining, by the email message delivery system, whether the email message is selected for scanning based on a sampling history associated with the group, the sampling history identifying a previously received email message that was selected for scanning in the group;
   responsive to determining that the email message is selected for scanning, scanning, by the email message delivery system, content of the email message;
   determining, by the email message delivery system, based on the scanning, whether the email message is to be filtered out; and
   responsive to determining that the email message is not to be filtered out based on the scanning, relaying, by the email message delivery system, the email message for delivery to the recipient.

16. The non-transitory computer-readable medium of claim 15 further comprising determining, by the email message delivery system, that the email message is to be filtered out based on the scanning and responsive to the determining, dropping, by the email message delivery system, the email message from the message queue.

17. The non-transitory computer-readable medium of claim 15 further comprising determining, by the email message delivery system, that the email message is not selected for scanning based at least in part on the sampling probability and responsive to the determining, relaying the email message for delivery to the recipient without scanning the email message.

18. The non-transitory computer-readable medium of claim 15 wherein determining the group for the email message comprises:
   identifying a set of one or more grouping rules for a sender associated with the message;
   identifying metadata associated with the email message; and
   determining the group for the email message based at least in part on the set of one or more grouping rules and the metadata.

19. The method of claim 1, wherein the email message delivery service is a cloud service implemented by one or more systems provided by a cloud service provider.

20. The method of claim 1, wherein the plurality of groups comprise at least a first group and a second group, wherein the first group is associated with a first sampling probability and the second group is associated with a second sampling probability, and wherein the first sampling probability is different from the second sampling probability.

* * * * *

UNITED STATES PATENT AND TRADEMARK OFFICE
CERTIFICATE OF CORRECTION

PATENT NO. : 11,483,270 B2
APPLICATION NO. : 17/458094
DATED : October 25, 2022
INVENTOR(S) : Edwin Earl Freed It is certified that error appears in the above-identified patent and that said Letters Patent is hereby corrected as shown below:

On the Title Page

Item [54], delete "EMAIL," and insert -- EMAIL --, therefor.

In the Specification

In Column 1, Line 1, delete "EMAIL," and insert -- EMAIL --, therefor.

In Column 12, Line 23, delete "the" and insert -- The --, therefor.

In Column 14, Line 16, delete "14" and insert -- ¼ --, therefor.

In Column 16, Line 26, delete "like." and insert -- like). --, therefor.

In Column 28, Line 67, delete "evolution)," and insert -- evolution)), --, therefor.

Signed and Sealed this
Fourth Day of July, 2023

*Katherine Kelly Vidal*

Katherine Kelly Vidal
*Director of the United States Patent and Trademark Office*